(12) United States Patent
Shaw

(10) Patent No.: US 9,605,422 B2
(45) Date of Patent: Mar. 28, 2017

(54) STORM WATER CATCH BASIN HAZARDOUS LIQUID VALVE

(71) Applicant: Mark D. Shaw, Ponte Vedra Beach, FL (US)

(72) Inventor: Mark D. Shaw, Ponte Vedra Beach, FL (US)

(73) Assignee: ULTRATECH INTERNATIONAL, INC., Jacksonville, FL (US)

( * ) Notice: Subject to any disclaimer, the term of this patent is extended or adjusted under 35 U.S.C. 154(b) by 694 days.

(21) Appl. No.: 14/073,280

(22) Filed: Nov. 6, 2013

(65) Prior Publication Data

US 2014/0124421 A1    May 8, 2014

Related U.S. Application Data

(60) Provisional application No. 61/723,097, filed on Nov. 6, 2012.

(51) Int. Cl.
    *E03F 5/04*  (2006.01)
    *E03F 5/10*  (2006.01)
    *B01D 21/30* (2006.01)

(52) U.S. Cl.
    CPC .......... *E03F 5/0411* (2013.01); *B01D 21/307* (2013.01); *E03F 5/0401* (2013.01); *E03F 5/0404* (2013.01); *E03F 5/107* (2013.01)

(58) Field of Classification Search
    CPC ........ B01D 21/307; E03F 1/00; E03F 5/0401; E03F 5/0411; E03F 5/106; E03F 5/107; E03F 2201/00; E03F 2201/10; Y10T 137/3006; F16K 31/30; F16K 31/32

USPC ........ 137/172, 192, 420; 210/100, 123, 126, 210/128, 747.2, 747.3, 163, 164, 170.03; 404/2–5
See application file for complete search history.

(56) References Cited

U.S. PATENT DOCUMENTS

| | | | | |
|---|---|---|---|---|
| 4,132,238 A | * | 1/1979 | Clark | B01D 17/0214 137/172 |
| 5,036,875 A | * | 8/1991 | Thiltgen | F16K 17/363 137/67 |
| 5,161,564 A | * | 11/1992 | Clark | B01D 17/0214 137/172 |

(Continued)

FOREIGN PATENT DOCUMENTS

WO    WO 2010042668 A1 *  4/2010  ........... C09D 7/1225

*Primary Examiner* — Heidi Kelley
*Assistant Examiner* — Eric McCullough
(74) *Attorney, Agent, or Firm* — Thomas C. Saitta

(57) ABSTRACT

A storm water catch basin hazardous liquid valve that is automatically responsive to the presence of hazardous liquids in storm water run-off, the valve utilizing a hydrophobic barrier member to separate hazardous liquids from water. Collection of a sufficient amount of hazardous liquids across the hydrophobic barrier member initiates a float release member to seal off the catch basin. In the neutral or non-activated status, the storm water run-off enters the catch basin, passes through the valve assembly and out through the storm water conduit system in normal manner. When a hazardous liquid, such as oil, gasoline, chemicals, etc., is present in the storm water run-off above a threshold amount, the valve activates to close off the catch basin such that the storm water run-off is precluded from entering the storm water conduit system.

20 Claims, 3 Drawing Sheets

(56) References Cited

U.S. PATENT DOCUMENTS

| | | | | |
|---|---|---|---|---|
| 5,348,041 A * | 9/1994 | Clark | ............... | B01D 17/0208 |
| | | | | 137/172 |
| 5,575,925 A | 11/1996 | Logue et al. | | |
| 5,681,455 A * | 10/1997 | Takai | ............... | E03B 3/02 |
| | | | | 210/154 |
| 5,960,811 A * | 10/1999 | Partridge | ............... | F16K 17/40 |
| | | | | 137/67 |
| 6,270,663 B1 * | 8/2001 | Happel | ............... | B01D 17/00 |
| | | | | 210/163 |
| 6,644,336 B2 * | 11/2003 | Dolan | ............... | F16K 17/406 |
| | | | | 137/68.11 |
| 7,989,619 B2 * | 8/2011 | Guire | ............... | C08K 5/0025 |
| | | | | 252/301.23 |
| 7,998,554 B2 * | 8/2011 | Wang | ............... | B05D 5/08 |
| | | | | 428/141 |
| 2004/0232057 A1 * | 11/2004 | Orozco | ............... | B01D 29/15 |
| | | | | 210/86 |
| 2012/0009396 A1 | 1/2012 | Sikka et al. | | |

\* cited by examiner

STORM WATER CATCH BASIN HAZARDOUS LIQUID VALVE

This application claims the benefit of U.S. Provisional Patent Application Ser. No. 61/723,097, filed Nov. 6, 2012, the disclosure of which is incorporated herein by reference.

BACKGROUND OF THE INVENTION

The invention relates generally to storm water drains or catch basins, and more particularly relates to valves or other shut-off mechanisms to preclude passage of storm water run-off through the catch basin. Even more particularly, the invention relates to such valves or other shut-off mechanisms that are automatically responsive to the presence of hazardous liquids, such as oil, chemicals or the like, in the storm water run-off.

Storm water catch basins are typically concrete structures buried below grade in paved areas, such as alongside streets or in parking lots, the catch basins being covered by heavy removable grates. The catch basins communicate with a storm water conduit system such that storm water run-off passes through the catch basins and then into the conduit system to be delivered to a remote location. It is known to provide filtering devices in the catch basins to filter out and retain trash, debris, particulate matter or the like from the storm water run-off for later disposal, such as shown for example in U.S. Pat. No. 5,575,925 to Logue, Jr. In addition to solid matter, however, hazardous liquids such as oil, gasoline, chemicals or the like may enter the catch basins due to accidental leaks or improper discharge of hazardous liquid containers, and these hazardous liquids will pass through these basic filters into the disposal system.

It is an object of this invention to provide an automatic liquid valve adapted for use within a catch basin, whereby such valve remains open in the passive state but closes to seal off the catch basin in the event hazardous liquids are encountered in the storm water run-off.

SUMMARY OF THE INVENTION

The invention is a storm water catch basin hazardous liquid valve that is automatically responsive to the presence of significant quantities of hazardous liquids in storm water run-off. In the neutral or non-activated status, the storm water run-off enters the catch basin, passes through the valve assembly and out through the storm water conduit system in normal manner, the valve assembly only minimally impeding the flow of water through the system. When a hazardous liquid, such as oil, gasoline, chemicals, etc., is present in the storm water run-off above a threshold amount, the valve activates to close off the catch basin such that the storm water run-off is precluded from entering the storm water conduit system.

In the embodiment shown, the hazardous liquid valve assembly comprises a spring-operated butterfly valve that is retained in the open position by a float release member, a portion of which is positioned within an open-topped hazardous liquid sump depending or positioned beneath a separation floor. Relatively large flow apertures are positioned around the separation floor, the apertures being of sufficient open area to allow storm water run-off to pass therethrough without impediment. A hydrophobic or superhydrophobic nanoparticle barrier member is located on the separation floor surrounding the open top of the hazardous liquid sump. A deflector member is positioned above the hazardous liquid sump and the hydrophobic nanoparticle barrier member, such that the majority of storm water entering the valve assembly is deflected laterally into the flow apertures but a minor amount of storm water is diverted onto the separation floor. A thin layer of storm water run-off is retained on the separation floor and contacts the hydrophobic nanoparticle barrier member. The hydrophobic nanoparticle barrier layer acts as a dam to prevent the water component of the storm water run-off from entering into the hazardous liquid sump, but hazardous liquids within the storm water run-off will be separated from the water and pass over the hydrophobic nanoparticle barrier member and into the hazardous liquid sump. As the volume of hazardous liquids in the sump rises, the float release member rises and releases the butterfly valve, thereby closing the bottom opening of the valve assembly and preventing any storm water run-off from passing through the catch basin.

DETAILED DESCRIPTION OF THE INVENTION

Figure 1:
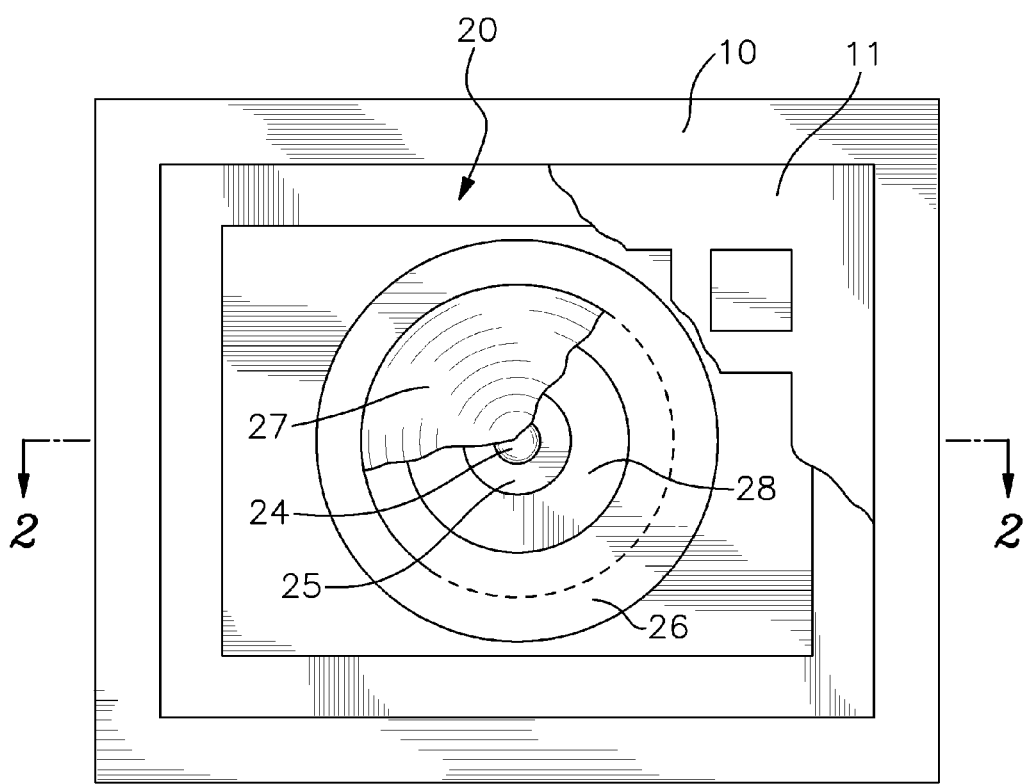
FIG. 1 is a top view showing an embodiment of the invention positioned within a storm water catch basin, with portions of the grate and valve assembly removed for clarity.
Figure 2:
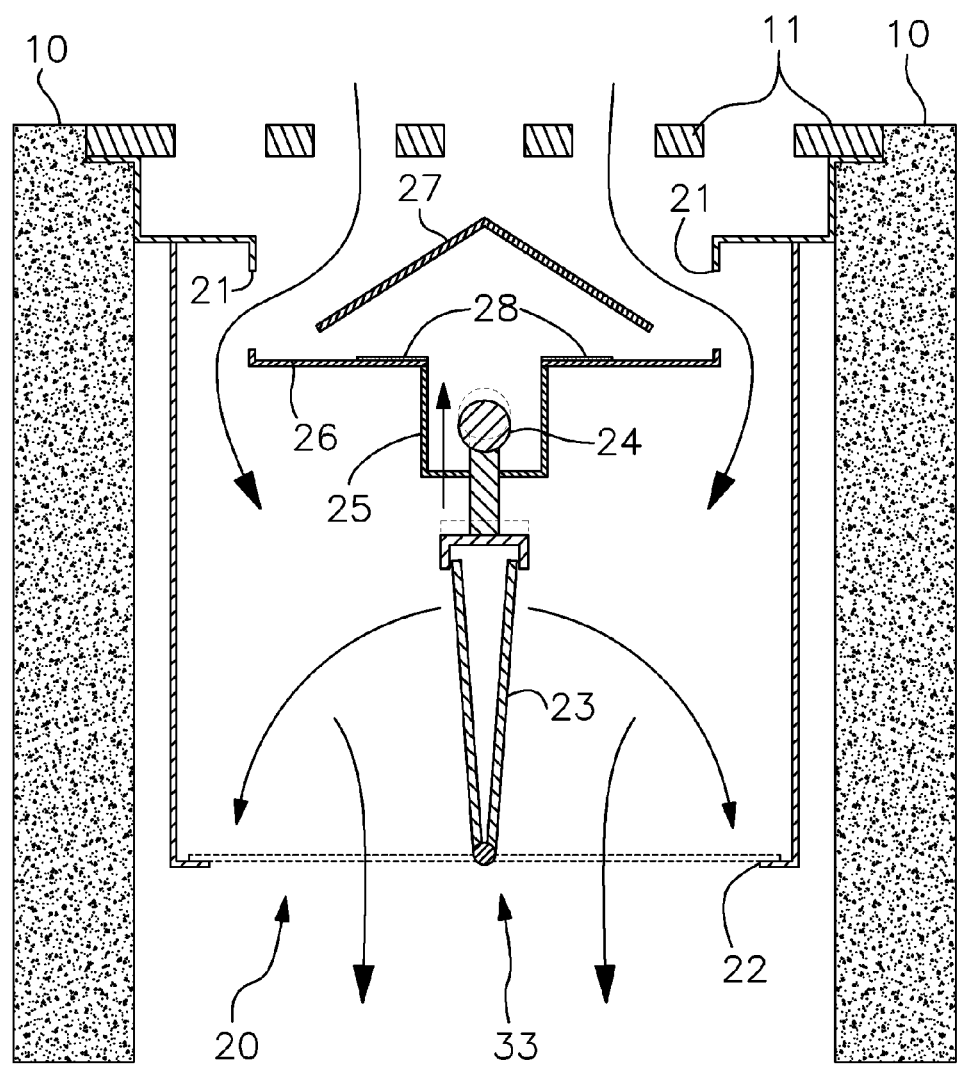
FIG. 2 is a cross-sectional view taken along line 2-2 of FIG. 1.

With reference to the drawings, the invention will now be described in detail with regard for the best mode and the preferred embodiment.

The invention is a storm water catch basin hazardous liquid valve assembly 20 that is automatically responsive to the presence of hazardous liquids 92 in storm water run-off 91. In the neutral or non-activated status, the storm water run-off 91 passes through the grate 11 and enters the catch basin 10, passes through the valve assembly 20 and out through the storm water conduit system in normal manner. The valve assembly 20 only minimally impedes the flow of the storm water 91. When a hazardous liquid 92 such as oil, gasoline, chemicals, etc., is present in the storm water run-off 91 above a threshold amount, the valve 20 activates to close off and seal the catch basin 10 such that the storm water run-off 91 is precluded from passing through and entering the storm water conduit system. The valve assembly 20 is disposed within the catch basin 10 such that all storm water run-off 91 entering the catch basin 10 passes through the valve assembly 20.

In the embodiment shown in the figures, the hazardous liquid valve assembly 20 comprises a spring-operated valve 33, preferably a butterfly valve comprising a pair of gate members 23 in combination with a large bottom opening 22. The valve 23 is retained in the open position by a float release member 24, a portion of which is positioned within an open-topped hazardous liquid sump 25 depending beneath a separation surface or floor 26. Relatively large flow apertures 21 are positioned around the separation floor 26, the apertures 21 being of sufficient open area to allow storm water run-off 91 to pass therethrough at maximum flow rate.

A relatively thin, flat, hydrophobic nanoparticle barrier member or layer 28, preferably annular, is located on the separation floor 26 surrounding and adjacent the open top of the hazardous liquid sump 25. The hydrophobic nanoparticle barrier member 28 is composed of a nanoparticle coating that repels water but not other liquids, such as oil, gas, chemicals or the like, and comprises a relative thin annular nanoparticle coating or layer deposited or applied to the upper surface of the separation floor 26. Such coatings, such as sold for example by UltraTech International, Inc., under the brand name ULTRA EVER DRY, utilize nanotechnology to produce hydrophobic surfaces, which are defined as having water drop contact angles of greater than 90 degrees, or superhydrophobic surfaces, which have contact angles of greater than 150 degrees. Preferably, the hydrophobic nanoparticle barrier member 28 is a superhydrophobic barrier member 28. Examples of suitable nanoparticle coatings providing such hydrophobic properties include the disclosures of U.S. Pat. No. 7,998,554 to Wang et al., U.S. Pat. No. 7,989,619 to Guire et al., and U.S. Patent Application Publication No. 2012/009396 to Sikka et al., the disclosures of which are incorporated herein by reference. In particular, the Sikka et al. reference addresses the creation of hydrophobic barriers for the control of water using thin barrier layers.

The hydrophobic nanoparticle barrier member 28 divides the separation surface or floor 26 into an outer annular area 31 where water may accumulate and an inner annular area 32 where water may not accumulate. Characteristics of the hydrophobic nanoparticle barrier member 28 are such that a thin layer of water, for example approximately 5 mm in height or less, coming into contact with the outer edge of the hydrophobic nanoparticle barrier layer 28 will be repelled and does not pass over and across the surface of the hydrophobic nanoparticle barrier layer 28. The lower edges of the flow apertures 21 are positioned at less than the height of the thin water layer from the upper surface of the separation floor 26, such the maximum water height on the separation floor 26 will remain below the height that would overflow the hydrophobic nanoparticle barrier member 28. In addition, a deflector member 27, which may be flat, cone-shaped, dome-shaped, etc., is positioned above the hazardous liquid sump 25 and the hydrophobic nanoparticle barrier member 28, such that the major amount of storm water 91 entering the valve assembly 20 is deflected laterally into the flow apertures 21 and a minor amount of the storm water 91 is directed onto the separation floor 26. Alternatively, the deflector member 27 may be slotted or apertured to allow for a small amount of the storm water 91 to drop onto the separation floor 26.

Figure 3:
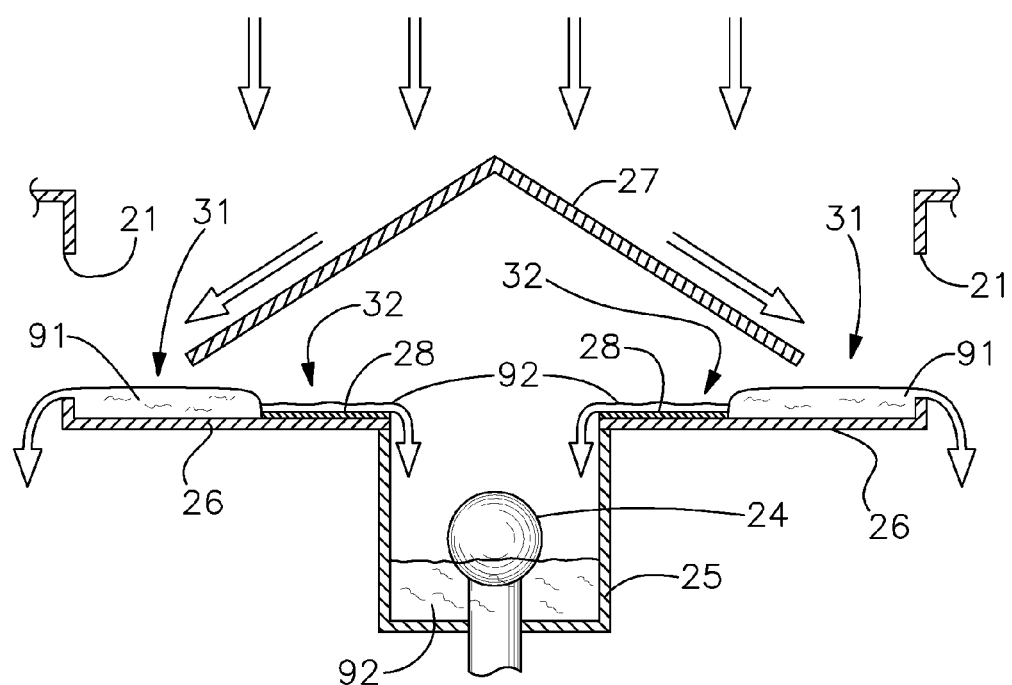
FIG. 3 is an enlarged view of a portion of FIG. 2 showing the flow pathways of the storm water run-off and the hazardous liquid.

With this structure, as storm water run-off 91 enters the catch basin 10 and valve assembly 20, the majority of storm water run-off 91 is directed through the flow apertures 21 to pass out through the large bottom opening 22 of the valve assembly 20, as shown in FIG. 3. A small amount of storm water run-off 91 is retained in a thin layer on the outer annular area 31 of separation floor 26 such that it abuts the outer edge of the hydrophobic nanoparticle barrier member 28. Because of surface tension effects, the hydrophobic nanoparticle barrier layer 28 prevents the water within the storm water run-off 91 from passing across the hydrophobic nanoparticle barrier layer 28 and entering into the hazardous liquid sump 25, but hazardous liquids 92 within the storm water run-off 91 will separate from or flow out of the storm water run-off 91 and pass over the hydrophobic nanoparticle barrier member 28 and into the hazardous liquid sump 25. As the volume of hazardous liquids 92 in the sump 25 rises, the float release member 24 is raised and releases the butterfly valve 23, thereby closing the bottom opening 22 of the valve assembly 20 and preventing any storm water run-off 91 from passing through the catch basin 10.

Signal or communication mechanisms or systems may be provided, such that when the valve assembly 20 is activated to seal off the catch basin, an alert or message is provided or transmitted to indicate that a hazardous liquid situation has been encountered, such that further environmental protection actions can be undertaken.

It is contemplated that equivalents or substitutions for elements and structure described above may be obvious to those of skill in the art, and therefore the true scope and definition of the invention is to be as set forth in the following claims.

I claim:

1. A storm water catch basin automatic valve assembly reactive to the presence of hazardous liquids chosen from the group of hazardous liquids consisting of gasoline and oil, said valve assembly comprising:
   a spring-operated float valve comprising a float release member;
   a hazardous liquid sump comprising an open top and depending from a separation floor, said float release member being disposed within said hazardous liquid sump;
   a hydrophobic nanoparticle barrier member positioned on said separation floor adjacent said open top of said hazardous liquid sump;
   whereby water present on said separation floor is precluded by said hydrophobic nanoparticle barrier member from passing into said hazardous liquid sump, and whereby said hazardous liquids present on said separation floor pass across said hydrophobic nanoparticle barrier member into said hazardous liquid sump, thereby raising said float release member to actuate said spring-operated float valve and stop flow of storm water through said valve assembly.

2. The valve assembly of claim 1, further comprising flow apertures and a deflector member positioned above said hazardous liquid sump, said deflector member directing a major amount of the storm water through said flow apertures.

3. The valve assembly of claim 2, wherein said deflector member directs a minor amount of the storm water onto said separation floor.

4. The valve assembly of claim 1, wherein said hydrophobic nanoparticle barrier member is an annular barrier.

5. The valve assembly of claim 1, wherein said hydrophobic nanoparticle barrier member is a superhydrophobic nanoparticle barrier.

6. The valve assembly of claim 2, wherein said hydrophobic nanoparticle barrier member is a superhydrophobic nanoparticle barrier.

7. The valve assembly of claim 3, wherein said hydrophobic nanoparticle barrier member is a superhydrophobic nanoparticle barrier.

8. The valve assembly of claim 1, wherein said spring-operated float valve further comprises a pair of gate members and an opening.

9. The valve assembly of claim 2, wherein said spring-operated float valve further comprises a pair of gate members and an opening.

10. A storm water catch basin automatic valve assembly reactive to the presence of hazardous liquids chosen from the group of hazardous liquids consisting of gasoline and oil, said valve assembly comprising:
    a spring-operated float valve comprising a gate member, an opening and a float release member;

a hazardous liquid sump comprising an open top and depending from a separation floor, said float release member being disposed within said hazardous liquid sump;

an annular hydrophobic nanoparticle barrier member positioned on said separation floor adjacent said open top of said hazardous liquid sump, such that said separation surface comprises an outer annular area where water may accumulate and an inner annular area where water may not accumulate;

flow apertures and a deflector member positioned above said hazardous liquid sump, said deflector member directing a major amount of the storm water through said flow apertures and a minor amount of the storm water onto said separation floor;

whereby water present on said separation floor is precluded by said hydrophobic nanoparticle barrier member from passing from said outer annular area and into said hazardous liquid sump, and whereby said hazardous liquids present on said separation floor pass across said hydrophobic nanoparticle barrier member into said hazardous liquid sump, thereby raising said float release member to actuate said spring-operated float valve and stop flow of storm water through said valve assembly.

11. The valve assembly of claim 10, wherein said hydrophobic nanoparticle barrier member is an annular barrier.

12. The valve assembly of claim 10, wherein said hydrophobic nanoparticle barrier member is a superhydrophobic nanoparticle barrier.

13. A storm water catch basin automatic valve assembly reactive to the presence of hazardous liquids chosen from the group of hazardous liquids consisting of gasoline and oil in combination with a storm water catch basin whereby storm water passes through said valve assembly, said valve assembly comprising:

a spring-operated float valve comprising a float release member;

a hazardous liquid sump comprising an open top and depending from a separation floor, said float release member being disposed within said hazardous liquid sump;

a hydrophobic nanoparticle barrier member positioned on said separation floor adjacent said open top of said hazardous liquid sump;

whereby water present on said separation floor is precluded by said hydrophobic nanoparticle barrier member from passing into said hazardous liquid sump, and whereby said hazardous liquids present on said separation floor pass across said hydrophobic nanoparticle barrier member into said hazardous liquid sump, thereby raising said float release member to actuate said spring-operated float valve and stop flow of storm water through said valve assembly.

14. The valve assembly of claim 13, further comprising flow apertures and a deflector member positioned above said hazardous liquid sump, said deflector member directing a major amount of the storm water through said flow apertures.

15. The valve assembly of claim 14, wherein said deflector member directs a minor amount of the storm water onto said separation floor.

16. The valve assembly of claim 13, wherein said hydrophobic nanoparticle barrier member is an annular barrier.

17. The valve assembly of claim 13, wherein said hydrophobic nanoparticle barrier member is a superhydrophobic nanoparticle barrier.

18. The valve assembly of claim 14, wherein said hydrophobic nanoparticle barrier member is a superhydrophobic nanoparticle barrier.

19. The valve assembly of claim 15, wherein said hydrophobic nanoparticle barrier member is a superhydrophobic nanoparticle barrier.

20. The valve assembly of claim 13, wherein said spring-operated float valve further comprises a pair of gate members and an opening.

* * * * *